United States Patent [19]

Kresge et al.

[11] Patent Number: 5,576,373

[45] Date of Patent: Nov. 19, 1996

[54] COMPOSITE TIRE INNERLINERS AND INNER TUBES

[75] Inventors: Edward N. Kresge, Watchung; David J. Lohse, Bridgewater, both of N.J.

[73] Assignee: Exxon Chemical Patents Inc., Wilmington, Del.

[21] Appl. No.: 473,601

[22] Filed: Jun. 7, 1995

Related U.S. Application Data

[60] Continuation-in-part of Ser. No. 467,257, Jun. 6, 1995, which is a division of Ser. No. 42,972, Apr. 5, 1993.

[51] Int. Cl.⁶ ............................................ C08K 3/34
[52] U.S. Cl. .................... 524/445; 524/447; 524/448; 524/450; 524/451; 524/449
[58] Field of Search ............................. 524/445, 447, 524/448, 449, 450, 451

[56] References Cited

U.S. PATENT DOCUMENTS

| | | | |
|---|---|---|---|
| 2,795,545 | 6/1957 | Gluesenkamp | 252/28 |
| 4,810,734 | 3/1989 | Kawasuri et al. | 523/216 |
| 4,889,885 | 12/1989 | Usuki et al. | 524/445 |

FOREIGN PATENT DOCUMENTS

| | | | |
|---|---|---|---|
| 5017641 | 1/1993 | Japan . | |
| WO92/01575 | 2/1992 | WIPO . | |
| WO93/04117 | 3/1993 | WIPO | C08K 3/34 |
| WO93/04118 | 3/1993 | WIPO | C08K 9/04 |
| WO93/11190 | 6/1993 | WIPO | C08K 7/00 |

*Primary Examiner*—Edward J. Cain
*Attorney, Agent, or Firm*—Myron B. Kurtzman; John E. Schneider

[57] ABSTRACT

Tire innerliners and inner tubes are prepared from blends of general purpose rubbers and silicate clay. The clays provide the requisite low air permeability without adversely affecting the flexibility of the rubber composition.

16 Claims, No Drawings

COMPOSITE TIRE INNERLINERS AND INNER TUBES

This application is a continuation-in-part of U.S. application Ser. No. 08/467,257, filed Jun. 6, 1995; which is a divisional of U.S. application Ser. No. 08/042,972, filed Apr. 5, 1993.

The invention relates to novel compositions useful for the manufacture of tire innerliners and inner tubes as well as innerliners and tubes containing these compositions. The innerliner compositions comprise various rubbers and mixtures of these rubbers containing silicate clay platelets. The addition of these platelets to the rubbers produces a composition which has sufficiently low air permeability to be useful in the manufacture of tire innerliners and inner tubes.

It is well-known in the art that tire innerliners must be constructed of materials which are relatively low in air permeability and yet flexible. General purpose rubbers do not possess the required low air permeability. The rubbers which have been almost exclusively used for this purpose are butyl rubbers, particularly the halogenated butyl rubbers. Until recently, only these polymers possessed the necessary traits to be useful in the manufacture of tire innerliners and tire inner tubes.

Recently, a novel family of copolymers has been used to manufacture tire innerliners. Published International Application PCT/US91/04896 discloses the use of isomonoolefin/para-alkyl styrene copolymers (IPMS) for the manufacture of tire innerliners. Tire innerliners made from these copolymers exhibit very low air permeability.

The addition of clays to rubber is well-known in the art. Clays have been added to rubber compositions to improve their strength. For example, U.S. Pat. No. 4,889,885 discloses the preparation of a composite material by adding a layered silicate to rubber to improve the mechanical properties. The resulting products, however, are relatively stiff and therefore are unsuitable for the use as tire innerliners.

A need exists to develop rubber compositions including general purpose rubbers, butyl rubbers, and IPMS rubbers which possess sufficiently low air permeability and are flexible so as to be suitable in the production of tire innerliners.

SUMMARY OF THE INVENTION

It has recently been discovered that by controlling the size, spacing, and orientation of specific silicate clay platelets in a rubber composition, for example, a general purpose rubber, butyl rubber or an IPMS rubber, a rubber composition is obtained having sufficiently low air permeability and flexibility to be useful as a tire innerliner or inner tube composition. This improved low air permeability obtained by use of the platelets does not substantially decrease the flexibility of the rubber required for its use in a tire. Thus it is now possible to produce a tire innerliner or inner tube from a general purpose rubber, and also improve the air permeability of butyl rubber or an IPMS rubber. Moreover, the ability to use general purpose rubbers for the inner-lining will help with the adhesion between the innerliner and the tire carcass in that the general purpose rubbers will be more compatible with the other rubber components of the tire.

The silicate platelets may also be contained in a butyl rubber type matrix. This results in lower air diffusion and is highly useful for tire innerliners and inner tubes with exceptionally long inflation retention.

In the practice of the invention the layers of silicate clay are dispersed in the rubber composition forming platelets of between 7 to 12 angstroms thick. The inter layer distance is about 12 angstroms or greater. In the practice of the invention the platelets should be aligned such that the majority of the platelets have their face perpendicular to the direction of gas diffusion. In this manner the platelets form a air barrier preventing the diffusion of air through the rubber of the innerliner.

DETAILED DESCRIPTION OF THE INVENTION

Pneumatic tires are typically produced so that the inflation gas, usually air, is contained by a barrier. This barrier can be an inner tube, an innerliner, or some part or all of the tire carcass. The barrier performs critical safety and utility functions in the tire. If diffusion of the air through the tire is minimized, inflation pressure is maintained over a long period of time. Under-inflation leads to tire damage and possible catastrophic tire failure.

Moreover, internal or inter-carcass pressure within the tire contributes to oxidative degradation of the rubber and reinforcing fibers and to internal flaw growth during operation.

The compositions of this invention which have air barrier characteristics greatly improved over the rubbers used to construct the body of the tire can be used as inner tubes or innerliners.

The compositions of this invention can be directly incorporated in the carcass of the tire. However, to keep the pressure as low as possible in the area of the reinforcing elements in the tire, the lowest diffusion composition in the tire should be on the high pressure side of these elements.

The innerliner, inner tube, or barrier compositions of the present invention comprise a rubber having layered silicate uniformly dispersed therein. The content of the layered silicate and the rubber should be 1 to about 50 parts per weight for 100 parts per weight of the rubber. With less than 0.5 parts per weight, insufficient silicate is present to adequately lower the air permeability of the composition. Conversely, when more than 50 parts by weight are used the composition is too stiff to be used as a tire innerliner composition. In the preferred embodiment the silicate comprises from 2 to 30 parts by weight.

The layered silicate creates an air barrier within the composition reducing the diffusion of air through the composition. The silicate is a layered phyllosilicate material composed of magnesium silicate layers or aluminum silicate layers having a thickness of 7 to 12 angstroms. The layered clay materials are negatively charged on account of the isomorphous ion exchange. They differ from one another in characteristic properties depending upon the density and distribution of the negative charges. The preferred layered silicate used in accordance with this invention is one which one negative charge occupies an area of 25 to 200Å$^2$ on the layer surface.

Examples of the layered silicates which may be used in the practice of the invention are various clay minerals including smectite clay, minerals such as montmorillonite, saponite, beidellite, montronite, hectorite, and stevensite; vermiculite and hallosite. These may be natural or synthetic clays. Of these montmorillonite is preferred.

In the present invention the innerliner composition should preferably be composed of a complex and a solid rubber. The complex is composed of a the reactive rubber having positively charged groups and a layered silicate uniformly dispersed in said reactive rubber with the interlayer distance greater than 12 angstroms. In addition, the complex should preferably h the reactive rubber is solubilized in the solid rubber. This structure (i.e. platelets, reactive rubber, and solid rubber) is responsible for the composite material having superior mechanical characteristics, (i.e. flexibility, strength) while obtaining excellent low air permeability. These pronounced effects are attributed to the following.

The layered silicate is uniformly dispersed in the solid rubber component because the layered silicate is directly bound to the reactive rubber having positively charged groups through ionic bonding and the reactive rubber is highly miscible in the solid rubber or can be reacted with the solid rubber. In addition, in the case of vulcanized rubber, the layered silicate is directly connected to the rubber network chain formed by the rubber component, so that the layered silicate greatly restricts the molecular motion of the rubber network chains in the vicinity of the interface.

The fact that the layered silicate is uniformly dispersed in the rubber component and is aligned with the faces of the layers essentially perpendicular to the pressure differential leads to the low air permeability of the composition.

The compatibility of the solid rubber with the complex composed of the layered silicate and the reactive rubber leads to low viscosity and good processability at the time of processing. This is an advantage over other systems which may tend to increase viscosity at the time of processing. In addition, the layered silicate directly connected to the reactive rubber is easily mobile and contributes to the dispersability of the layered silicate. The innerliner composition is produced such that the layered silicate is uniformly dispersed in the rubber composition. This structure is formed by dispersing the layered silicate into the reactive rubber and solubilizing (i.e., mixing and desolving) the reactive rubber in the complex into the solid rubber. Any attempt to uniformly disperse the layered silicate without the reactive rubber into solid rubber would be unsuccessful because of the incompatibility of the two components. Thus the above-mentioned structure (i.e. composite material) cannot be made in such a reverse way.

The reactive rubber, which is commercially available, used in the present invention is one which has a positively charged group. The positively charged group may be in the main chain or side chain of the reactive rubber or at the terminal end thereof. The reactive rubber may have one or more positively charged groups in one molecule. Examples of the reactive rubber can include those which have polybutadiene; butadiene copolymers containing styrene, isoprene, acrylonitrile; polyisobutylene; isobutylene copolymers containing, butadiene, isoprene, styrene, paramethylstyrene; polychloroprene; ethylene propylene diene copolymers; polyisoprene; copolymers of isoprene and styrene, butadiene and acrylonitrile; natural rubber; or modified product thereof in the main chain or a portion thereof and also have in the molecule an onium salt represented by~$M^{\oplus}R^1R^2R^3$ (where M denotes N, S, P, or

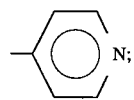

and $R^1$, $R^2$, and $R^3$ independently denote hydrogen, alkyl groups, aryl groups, or allyl group, which may be the same or different) or an onium salt precursor represented by the formula~$MR^1R^2$(where M denotes N, S, P, or

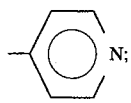

and $R^1$ or $R^2$ independently denote hydrogen, alkyl groups, aryl groups and allyl groups, which my be the same or different). One or more reactive rubbers may be used. The covulcanization of the reactive rubber and the solid rubber depends on the molecular weight of the reactive rubber and the types of crosslinking sites as well as their concentration. For good covulcanization, the reactive rubber should preferably have a molecular weight higher than 450.

The layered silicate is uniformly dispersed into the reactive rubber. The layered silicates is contained in the complex in an amount of 1 to 45 parts by weight per 100 parts of the reactive rubber. The dispersion of the layered silicate produces an ionic association between the reactive rubber, preferably liquid rubber, and the layered silicate. In other words, the individual layers of the silicate are completely separated from one another by the force greater than the bonding force (such as van der Waals forces and electrostatic attractive forces) between the layers. Moreover, the negative charge on the silicate is associated with the positive charge (onium ion) in the reactive rubber through ionic bonding or association.

A substantial fraction of the layered silicate in the complex should have an interlayer distance of greater than 12 angstroms. With an interlayer distance less than 12 angstroms, the complex does not uniformly disperse into the solid rubber.

The solid rubber should preferably be one which has a molecular weight of greater than 10,000 so that it can be vulcanized or crosslinked in the bulk state. Solid rubbers which may be used in the practice of this invention include polybutadiene; butadiene copolymers containing styrene, isoprene or acrylonitrile; polyisobutylene, isobutylene copolymers containing butadiene, isoprene, styrene or paramethylstyrene; polychloroprene, ethylene propylene diene copolymers; polyisoprene, isoprene copolymers containing butadiene, styrene, acrylonitrile and natural rubber.

The complex composed of the layered silicate and reactive rubber should be compounded with the solid rubber at a ratio of 1 to 100 parts by weight of the former to 100 parts by weight of the latter, preferably 2 to 50 parts by weight per 100 parts by weight of the solid rubber. If the amount of the complex is less than 1 part by weight, the layered silicate produces little effect for the rubber phase containing solid rubber and reactive rubber. With an amount in excess of 100 parts by weight, the content of the reactive rubber in the rubber phase is so high that it impairs the inherent characteristics of the solid rubber.

The rubber composition may be incorporated according to need with carbon black to enhance the reinforcement effect and other characteristics of the rubber. Examples of carbon black include SAF (N11), ISAF (N220), HAF (N330), FEF (N550), GPF (N660), and SRF (N770) [ASTM designations in parentheses]. Carbon black should be added in an amount of 0 to 100 parts by weight, preferably 0 to 70 parts by weight for 100 parts by weight of the solid rubber. With an amount in excess of 100 parts by weight, the resulting rubber composition has such a high viscosity that the improvement of processability of the complex is less significant.

Other compounding materials may also be used in the compositions to control rheological and physical properties well known in the art. These include non-reinforcing fillers, such as, clays and plasticizers, such as hydrocarbon process oils, low molecular weight hydrocarbon resins and alkyl phthalates.

The content of the layered silicate in the innerliner compositions should preferably be 2 to 50 parts by weight for 100 parts by weight of the total rubber. With the content of less than 1 part by weight, the layered silicate does not significantly reduce the air permeability of the innerliner composition. With a content of greater than 50 parts by weight, the resulting innerliner composition is too stiff for use as a tire innerliner.

The rubber composition is characterized by the fact that the reactive rubber in the complex is solubilizable in or reactive with the solid rubber. In other words, the reactive rubber component in the complex has good miscibility with the solid rubber or can be made to crosslink with the solid rubber. The solid rubber includes elastomeric compositions that exhibit glass transition temperatures of less than about −25° C. Examples of these solid rubbers include polybutadiene; butadiene copolymers of styrene, isoprene, or acrylonitrile; polyisobutylene; isobutylene copolymers containing butadiene, isoprene, styrene, or para-methylstyrene; polychloroprene; ethylene propylene diene copolymers; polyisoprene; isoprene copolymers containing butadiene, styrene or acrylonitrile and natural rubber. The thermoplastic elastomers may also be used for the solid rubber component of the invention.

The rubber composition may have incorporated, in addition, carbon black, acid acceptors, or antioxidants or other commonly used additives according to need. This rubber composition can be vulcanized with sulfur, peroxide, etc. or other vulcanizing agents and vulcanization accelerators commonly used for solid rubbers. In addition, vulcanization can be accomplished with any vulcanizing molding machine.

The innerliner composition of the present invention may be produced according to the following process. First, a clay mineral composed of a layered silicate is uniformly dispersed in water in a concentration lower than 5 wt. %. Separately, reactive rubber having a positively charged group, preferably a terminal end group, is dispersed in a solvent in a concentration lower than 50 wt. %. They are mixed together with vigorous stirring to make a homogeneous mixture. The mixing ratio of the layered silicate to the reactive rubber should preferably be 1:0.1 to 1:5 on a dry basis. The complex which is composed of the layered silicate in reactive rubber and dispersed in the water containing mixed solvent is collected by vacuum filtration or pressure filtration followed by a preliminary drying at 50 to 100° C. in air followed by drying at 80° to 150° C. in vacuo. The solubilization of the reactive rubber having silicate uniformly dispersed therein in the complex into the solid rubber may be accomplished by mixing the complex with solid rubber or by mixing with an emulsion or latex of the solid rubber. During the mixing, carbon black or other additives are added. Thus, there is obtained the desired composite material which is based on rubber as the resin.

The rubber compositions of the present invention can then be formed into tire innerliners or inner tubes using conventional processing techniques such as calendering or extrusion followed by building the tire and molding.

It has been discovered that when the compositions of this invention are prepared they exhibit a brittle temperature of less than about −20° C. and an air diffusion of less than one half of that of styrene butadiene rubber and also are preferably crosslinkable with chemical curatives.

In producing the tire innerliner composition of the invention, care must be taken to insure that the platelets are at least 25 times longer and 25 times wider than they are thick and that the plates are on average arranged such that about 40% of the platelets are arranged so that the face is perpendicular to the direction of gas diffusion due to an imposed pressure differential. Orientation can be determined by methods well known in the art such as electron microscopy.

Platelets can be arranged in several ways. Extruding, extending or shearing the material before crosslinking lines the plates up in the direction of flow. In addition, if the platelets are small, and have charges on the surface, this can facilitate a self-aligning morphology to inhibit diffusion. The use of the self-aligning characteristic is particularly useful if the materials are prepared with a solvent present to reduce the viscosity of the system. In this case the inneliner may be cast as a film and used conventionally or applied to a vulcanized tire.

EXAMPLE 1

A layered silicate, montmorillonite clay, was slurried with water at one part of clay per 100 parts of water and centrifuged to remove impurities. The clay slurry was then contacted with excess ion exchange resin. The resin was in the acid form and thus produced the acid form of the clay. The water slurry of the acid clay was contacted in a Waring blender with a 5% by weight toluene solution of a reactive rubber, Hycar 1300 (amine terminated butadiene-acrylonitrile oligomer from B.F. Goodrich Co., Mn about 1300). On contact in the Waring blender there was a sharp increase in the viscosity. The material was further mixed in a microfluidizer and the water and toluene were removed by distillation. The final material contained 25 parts of clay per 75 parts of reactive polymer. The material was light brown and clear. The distance between the silicate layers was determined by x-ray scattering to be 14 angstroms. The glass transition temperature was measured by dynamic mechanical thermal analysis. The material exhibited a major loss peak (maximum in tanδ) at −37° C. The major loss peak for the Hycar 1300 without the clay was −41° C.

The polymer-clay composition was pressed into a film about 17 mils thick in a press heated to 125° C. to give a clear, flexible film. The diffusion of gas through the film was measured on an Oxtran 2/20 diffusion device manufactured by Mocon, Minneapolis, Minn. The experiments were carried out at 30° C. and 0% relative humidity. Oxygen was used as the diffusing gas. Under these conditions the polymer-clay composition exhibited an oxygen transmission rate of 4.2 $cm^3$-mil/$m^2$ day $10^3$. Under the same condition a styrene-butadiene copolymer (SBR-1500) typically used in the manufacture of tires had an oxygen transmission rate of 91.2 $cm^3$-mil/$m^2$ day $10^3$ or about 22 times greater than the composite.

EXAMPLE 2

The polymer-clay composition of Example 1 was applied to the inner surface of a passenger car tire at a thickness of about 15 mil. Prior to the application of the polymer-clay composition the tire lost inflation pressure at about 1.5 psi/month at 30° C. at an inflation pressure of 32 psi. After the polymer-clay composition was applied the loss of inflation pressure was less than 0.2 psi/month.

Example 3

A polymer clay composition containing 4.8 parts montmorillonite clay, 19 parts Hycar 1300 amine terminated butadiene acrylonitrile oligomer and 76 parts by weight of styrene-butadiene copolymer (SBR-1500) was synthesized by first reacting acid clay with the reactive polymer by the procedure of Example 1. After the reactive polymer and clay had been mixed, SBR-1500 emulsion was added with further mixing in the microfluidizer. Toluene and water were then removed by distillation and further drying under vacuum. The polymer-clay composition was pressed into a film 22 mils in thickness on a hot press at 125° C.

The film was soft and flexible at room temperature and had a brittleness temperature of less than about 45° C. The oxygen transmission rate was measured under the conditions of Example 1 and found to be 42.5 $cm^3$-mil/$m^2$ day $10^3$. This is less than one-half the oxygen transmission rate of the SBR-1500.

EXAMPLE 4

The polymer clay composition of Example 3 was compounded on a two-roll mill with 2 phr (parts per hundred parts of rubber by weight) of stearic acid, 5 phr zinc oxide, 2 phr sulfur, and 1.5 phr Altax (benzothiazyl disulfide) and vulcanized into a 20 mil thick pad by heating in a mold for 20 min. at 153° C.

The composition was insoluble in toluene showing it to be well cured and it exhibited the same oxygen transmission rate as the uncured sample.

The composition containing the curatives was sheeted out on a two roll mill to form an uncured sheet about 35 mils in thickness. SBR-1500 was compounded with the same amounts of curatives and also sheeted out on a two roll mill to form an uncured sheet about 30 mils in thickness. The sheets were pressed together in a mold and press cured by heating for 20 min. at 153° C. The sheets could not be separated after vulcanization.

What is claimed is:

1. A tire inner-tube comprising a complex and solid rubber, said complex being composed of reactive rubber having a positively charged group and a layered silicate uniformly dispersed therein, the interlayer distance of said layered silicate being greater than 12 angstroms and the reactive rubber being soluble in or crosslinkable with the solid rubber.

2. The tire inner-tube described in claim 1 wherein the reactive rubber is one which has a molecular weight of greater than 450.

3. The tire inner-tube as claimed in claim 1 wherein the layered silicate is contained in the complex in an amount of 1 to 45 parts by weight per 100 parts by weight of the reactive rubber.

4. The tire inner-tube as described in claim 1 wherein the solid rubber is one selected from the group consisting of natural rubber, synthetic rubber, thermoplastic elastomer and blends thereof.

5. The tire inner-tube as defined in claim 1 wherein the solid rubber is polybutadiene.

6. The tire inner-tube as claimed in claim 1 wherein the solid rubber is one which has a molecular weight of not less than 10,000.

7. The tire inner-tube as defined in claim 1 wherein the content of said complex is 2 to 50 parts by weight per 100 parts by weight of the solid rubber.

8. The tire inner-tube as defined in claim 1 which further comprises carbon black.

9. The tire inner-tube as defined in claim 1 wherein said reactive rubber comprises one or more rubber selected from the group consisting of polybutadiene; butadiene copolymer which contains styrene, isoprene, or acrylonitrile; polyisobutylene; isobutylene containing copolymers containing butadiene, isoprene, styrene, para-methylstyrene; polychloroprene; ethylene propylene diene copolymers; polyisoprene; isoprene copolymers containing isobutylene, butadiene, styrene or acrylonitrile; natural rubber; or modified product thereof said reactive rubber further comprising an onium salt or an onium salt precursor.

10. The tire inner-tube defined in claim 9 wherein said onium salt has the general structure

wherein M denotes nitrogen, sulfur, phosphorous or

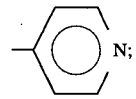

and $R^1$, $R^2$, and $R^3$ independently denote hydrogen, alkyl groups, aryl groups or allyl groups which may be the same or different.

11. The tire inner-tube defined in claim 9 wherein said onium salt precursor has the general structure

wherein M denotes nitrogen, sulfur, phosphorous or

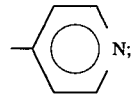

and $R^1$ and $R^2$ independently denote hydrogen, alkyl groups, aryl groups or allyl groups which may be the same or different.

12. The tire inner-tube defined in claim 1 wherein said reactive rubber is an amine terminated rubber.

13. The tire inner-tube defined in claim 11 wherein said reactive rubber comprises amine terminated butadiene-acrylonitrile rubber.

14. The tire inner-tube defined in claim 1 wherein said layered silicates comprises phyllosilicate.

15. The tire inner-tube defined in claim 1 wherein said layered silicates is a clay selected from the group consisting of smectite clays, vermicultite and hallosite.

16. The tire inner-tube defined in claim 1 wherein said layered clay is montmorillonite.

\* \* \* \* \*